United States Patent [19]

Frieder et al.

[11] Patent Number: 4,577,942
[45] Date of Patent: Mar. 25, 1986

[54] LAMINATED HIGH CORRECTION EYEGLASS LENS

[75] Inventors: Philip M. Frieder, Miami; Edward de Rojas, Lauderhill, both of Fla.

[73] Assignee: Optical Systems International, Inc., Hialeah, Fla.

[21] Appl. No.: 468,694

[22] Filed: Feb. 22, 1983

[51] Int. Cl.$^4$ .......................... G02C 7/02; G02C 7/06
[52] U.S. Cl. ..................... 351/159; 351/166; 351/167; 351/172; 351/177
[58] Field of Search ............... 351/159, 167, 166, 172, 351/176, 177

[56] References Cited

U.S. PATENT DOCUMENTS

| | | | |
|---|---|---|---|
| 1,948,636 | 2/1934 | Tillyer | 351/176 X |
| 2,618,200 | 11/1952 | Clave et al. | 351/172 |
| 3,877,798 | 4/1975 | Tolar et al. | 351/176 X |
| 4,261,656 | 4/1981 | Wu | 351/166 X |

FOREIGN PATENT DOCUMENTS 0010742  1/1977  Japan .................... 351/177

*Primary Examiner*—John K. Corbin
*Assistant Examiner*—Scott J. Sugarman
*Attorney, Agent, or Firm*—Jack E. Dominik

[57] ABSTRACT

Disclosed is a high index of refraction glass base lens in combination with readily castable CR-39 or equivalent plastic veneer overlay. The high index of refraction glass serves to bend light quickly and radically to eliminate the need for excessive lens thickness and curvature, thus reducing the overall mass and weight of the lens. For example: A $-10.00$ D. prescription lens made from CR-39 plastic requires front and back curvatures totalling $-10.60$ D. with an accompanying edge thickness at 71 mm diameter of 17.3 mm. This same $-10.00$ D. prescription lens made from the standard crown glass of the ophthalmic industry (index of refraction 1.523) would require a total front and back curves of $-10.00$ D. and will have an accompanying edge thickness at 71 mm diameter of 16.5 mm. The subject invention lens utilizes high index of refraction glass, so that a $-10.00$ D prescription can be made from a lens embodiment whose front and back curves total $-6.57$ D. with an accompanying edge thickness at 71 mm of 9.1 mm. The veneer overlay has a central zone with no correction, and negative correction on its periphery. Thus asphericity is provided irrespective of whether the base lens correction is positive or negative. In addition, bifocal, trifocal, or other vocational corrections may be positioned in the veneer overlay.

10 Claims, 6 Drawing Figures

LAMINATED HIGH CORRECTION EYEGLASS LENS

FIELD OF THE INVENTION

The present invention relates to an improved component system for forming spectacle lenses for patients requiring stronger than average prescriptions.

SUMMARY OF THE PRIOR ART

At the present time there are many aspheric lens designs available for cataract patients requiring prescriptions stronger than +8.75 D. Almost all of these lenses are molded from CR-39 plastic because the aspheric grinding of glass lenses is too expensive and too difficult.

The prior art is exemplified by Welsh Pat. No. 4,073,578 issued Feb. 14, 1978 and Frieder Pat. No. 4,185,897 issued Jan. 29, 1980. Both of these patents deal with spectacle lenses having positive corrections in the central portion and aspherisity in the peripheral portion.

The foregoing prior-art aspheric plastic lenses do not address themselves to patients requiring prescriptions from +5.00 D. through +8.50 D., nor do they correctly address themselves to patients wearing prescriptions from +8.75 D. to +10.00 D. The aforementioned ignored end of the strong lens market is incorrectly aspherized by the major manufacturers because it comprises only about 2% of their overall sales in the strong prescription market. There are manufactured lenses correctly designed for patients wearing +10.50 D. to +16.00 D. Their asphericity is too much for the prescriptions from +5.00 D. to +10.50 D. and inadequate for prescriptions from +16.50 D. and higher. This is because the major portion of the aphakic market falls into the prescription range from +10.50 D. to +16.00 D. and therefore, this is the power range that has been directly addressed by today's available aspheric lenses.

Also aspheric lenses are not available for myopic patients wearing prescription powers from −4.00 D. to −35.00 D. which correct for the vertex distance error as will be later described herein.

SUMMARY OF THE INVENTION

This invention provides for using a high index of refraction glass base lens in combination with readily castable allyldiglycol carborate such as CR-39 made by PPG Industries or an injection moldable plastic with good optical properties or equivalent plastic veneer overlay. The high index of refraction glass serves to bend light quickly and radically to eliminate the need for excessive lens thickness and curvature, thus reducing the overall mass and weight of the lens. For example: A −10.00 D. prescription lens made from CR-39 plastic requires front and back curvatures totalling −10.60 D. with an accompanying edge thickness at 71 mm diameter of 17.3 mm. This same −10.00 D. prescription lens made from the standard crown glass of the ophthalmic industry (index of refraction 1.523) would require a total front and back curves of −10.00 D. and will have an accompanying edge thickness at 71 mm diameter of 16.5 mm. The subject invention lens utilizes high index of refraction glass, so that a −10.00 D prescription can be made from a lens embodiment whose front and back curves total −6.57 D. with an accompanying edge thickness at 71 mm of 9.1 mm. The veneer overlay has a central zone with no correction, and negative correction on its periphery. Thus asphericity is provided irrespective of whether the base lens correction is positive or negative. In addition, bifocal, trifocal, or other vocational corrections may be positioned in the veneer overlay.

An object of the present invention is to allow the overall lens to be made much thinner and flatter giving the wearer less prismatic 'effects', thinner lens edges in the case of the myopic patient which reduces the edge scotoma and increases the field of vision, resulting in greater confidence for walking, climbing stairs, driving, working, and general ambulation. In the case of the far-sighted patient, wearing any prescription from +5.00 D. to +25.00 D., and whether just aphakic or simply hyper-metropic or presbyopic, the same high index of refraction glass permits lenses to be made with much thinner center thicknesses because the strong front curve can be made 65.7% flatter than its counterpart in index of refraction 1.523 crown glass. In addition asphericity and vocational corrections, tinting, and hardening can all be provided in the finished lens.

BRIEF DESCRIPTION OF THE DRAWINGS

Further objects and advantages of the present invention will become apparent as the following description and discussion proceeds, taken in conjunction with the accompanying illustrative drawings, in which.

DESCRIPTION

Figure 1:
FIG. 1 is a transverse diagrammatic sectional view of an illustrative completed lens having a vocational correction, and designated as L− meaning lens having a minus correction.

The differences between the utilization of a plastic lens normally formed from CR 39, and high index of refraction glass as contemplated by the present invention is apparent from the following description of typical lenses, for example: A +5.00 D. lens in CR-39 plastic is generally made in the ophthalmic industry using a front base curve of +10.25 D. and a back curve of −4.87 D.: A total lens curve of +5.37 D. This lens will have a center thickness of 8.6 mm when its diameter is 71 mm and the edge thickness is 1.2 mm, which are the standards of the industry.

A +5.00 D. lens made from crown glass is generally made on a front base curve of +10.25 D., and has a posterior curve of −5.25 D. giving a total curvature of +5.00 D. It will have a center thickness of 8.3 mm when it is made in a 71 mm blank, having an edge thickness of 1.5 mm. These are also the standard specifications of the ophthalmic industry today.

The subject invention uses as its base lens a high index of refraction (1.805) glass enabling a +5.00 D. prescription lens to be made with a +8.25 D. front curve having a posterior curve of −5.00 D. This gives the base lens an overall curvature of +3.25 D., much flatter than any of the above standard lens examples. The lens illustrative of the present invention has a center thickness of 4.6 mm when manufactured using 71 mm blank diameters, and the edge thickness is zero because of the veneer type CR-39 cover lens described next.

The above examples demonstrate the usefulness of high index of refraction glass in manufacturing prescription lenses for spectacles in that lenses can be made flatter and thinner however, there are some problems:

The first is that most high index glass are not readily chemically strenghthened to ANSI standards and cannot be heat treated using the industry's case hardening system techniques for the necessary impact resistant testing required by the American National Standards Institution, and required by law. Most high index of refraction glasses will not withstand a drop ball test, as required by ANSI.

The second problem of high index of refraction glass is that when bifocals are required they cannot be fused into the glass because of the material of the glass, and because there are no glass materials with still higher indeces of refraction, necessary to obtain the additional power of the bifocal segment. Glued on bifocal segments have not been acceptable in the industry because they are ugly in appearance and eventually fall off. This means that high index of refraction glass has not been heretofore available for bifocals or trifocals in the categories of patients with strong lens prescriptions, from +4.00 D. to +25.00 D., and from −4.00 D. to −35.00 D.

A third problem of using high index of refraction glass heretofore has been that colors were not readily available. The only possibility for adding the often very necessary tint was to send the lenses to a coating facility where breakage is extremely high due to the nature of the high index of refraction glass. Colors simply have not been practical for high index of refraction glass lenses.

A fourth disadvantage of using high index of refraction glass is that it is not available with adequate ultraviolet filtering qualities which are now considered important by many ophthalmologists and have remained not available.

A fifth disadvantage of using high index of refraction glass is that these lenses are made from softer glass with higher lead contents and they scratch easily.

The present invention resolves all the above problems by laminating plastic veneer covers on top of the high index of refraction glass. The two lenses laminated together produce the positive results that are only possible when the lenses are manufactured in combination with two elements. Where the designation CR-39 is used it refers to an allyldiglycol carborate made by PPG Industries, any equivalent castable material, or injection moldable material having good optical properties. The CR-39 or equivalent veneer cover VC+ and VC− subject lens is cast from polished glass or metal molds having aspheric surfaces designed to negate the vertex distance power error created by the changing vertex distance between the eye and the back of the lens as it attempts to see centrally and peripherally, and also when it rotates to use central vision looking through all different angles, all the way out to the edge of the lens.

The optical principle involved is that when a lens is moved away from the eye, its effective power gains plus power. This means that when a +5.00 D. lens is fitted in front of an eye at a vertex distance of 10 mm, it will have an effective power of +5.00 D. and for the purpose of this example, presupposes that light focusses correctly on the Retina. However, what is overlooked by the ophthalmic industry today is the fact that this +5.00 D. lens is often fitted into 56 mm eye size frames, whose edges are 30 mm away from the eye. This example illustrates that a +5.00 D. lens fitted 10 mm from the eye centrally, is also inadvertently fitted 30 mm away from the eye at its temporal edge giving a latent residual vertex power error of 20 mm, which is +0.55 D. In other words, +5.00 D. lenses correctly fitted on a patient are giving that same patient +5.55 D. of lens correction temporally. This inadvertently induced latent residual power error of +0.55 D. is unwanted and creates significant peripheral problems.

The present invention contemplates resolving those problems by laminating a veneer CR-39 plastic, or equivalent, lens having a central zone 0 without correction and a peripheral zone A, B having progressively increasing negative correction proportional to the required prescription, and increments designed by base curve changes to be described later.

A myopic patient wearing a −5.00 D. prescription lens suffers the exact same dilemma which has been heretofore ignored. When a −5.00 D. lens is correctly fitted on a patient having a central vertex distance of 10 mm and in a 56 mm eye size frame, the average vertex distance to the lens is about 28 mm. The lens edge is therefore gaining plus power at the rate of an 18 mm over-correction which is +0.41 D. In other words, a −5.00 D. lens is really −4.59 D. lens at its edge when mounted in 56 mm eye size frames, which are standard in the industry.

Figure 3:
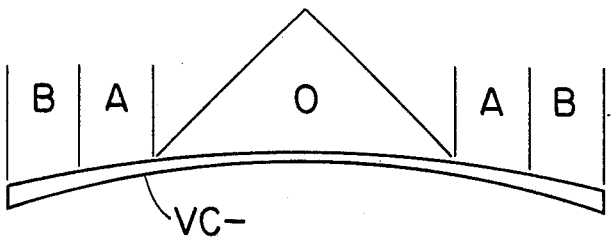
FIG. 3 is a similar view but of the veneer cover utilized in the lens shown in FIG. 1 designated as VC− meaning veneer cover minus correction. Designated as zero is the central zone and areas A and B are the respective peripheral zones extending from the central zone.
Figure 6:
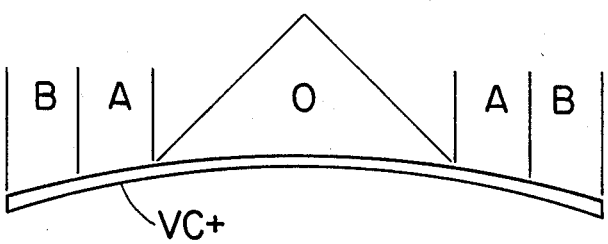
FIG. 6 is a view of the veneer cover for the lens of FIG. 4, identifying as zero the central zone, and as A and B the respective zones on the periphery of the central zone.

The present invention contemplates using a plastic CR-39 veneer overlay lens VC− or VC+ (see FIGS. 3 and 6) having a central zone 0 without correction and a peripheral zone A, B having progressively increasing negative correction at a rate to neutralize the problem of vertex power error as above described and in increments of base curves as described below. The CR-39 plastic veneer cover VC+, VC− is made with its anterior surface having a central zone 0 of zero correction and a peripheral zone A, B having progressively increasing negative correction (asphericity). The posterior curve of the veneer lens is almost the same as the anterior surface of the prescription high index glass lens having the focussing power of the patient's prescription.

Prescription lenses standardly change their anterior curvature according to basic categories of focussing power. Each of these basic categories are sufficiently narrow in range so as to cause very similar vertex power errors. Each of these ranges have veneer overlays having an amount of progressively negative correction peripherally to neutralize the vertex power error.

The veneer overlay lens is further available with ultraviolet filtration capabilities. The veneers also are tintable in all the standard colors of the ophthalmic industry and using the same tinting techniques. The veneer overlays are also available with bifocals or trifocals, on their anterior surfaces. The combination of the veneer overlay with its bifocal or trifocal, and its ultraviolet filtration, and its aspheric curvatures and scratch resistant qualities, together with the high index of refraction (1.805) glass, constitutes the first lens system ever available for patients requiring focussing power lenses stronger than 4.00 diopters in either plus or minus forms.

An advantage of the present aspheric veneer lens system is that it minimizes the error of unwanted induced magnification for hyperopic, presbyopic and aphakic patients and the same system reduces unwanted minification for myopic patients by using high index of refraction glass. This reduction of unwanted magnification and minification has been previously available, however has never been available with all the features carried by the veneer CR-39 overlay lens such as bifocals, trifocals, ultraviolet filtration, scratch resistant coating, aspheric curvatures for vertex distance power error, and tints for cosmetic or photofobic needs.

The Method

A high index of refraction glass is selected for the manufacturing of spectacle lenses for prescription powers from +4.00 D. to +25.00 D., BL+ and from −4.00 D. to −35.00 D BL−. These lenses are all manufactured using standard surfacing techniques but need only 65.7% of the curvature required by standard ophthalmic crown glass.

Figure 2:
FIG. 2 is a view taken from the same vantage point and scale as FIG. 1 identifying the base lens portion of the composite lens with the designation BL− minus meaning base lens minus correction.
Figure 5:
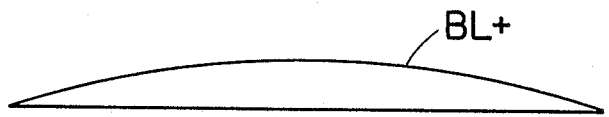
FIG. 5 is a view of the base lens of the composite lens of FIG. 4 identified as BL+.

The aforedescribed prescription lens now becomes the base element BL+, BL− (see FIGS. 2 and 5) of the lens. A CR-39 plastic veneer cover lens VC+, VC− is then manufactured having its posterior surface made the same as the anterior surface of the prescription base lens. This is necessary for a close optical fit during the lamination process which will be described later.

The anterior surface of the veneer cover lens has a central zone 0 of zero corrective power and a progressively increasing negative correction zones A and B all the way out to the edge of the lens. The amount of progressive correction depends upon the posterior surface increments. The posterior surface increments in turn depends upon the anterior surface increments of the base lens. The anterior surface increments of the base lens in turn depends on the prescribed focussing power of the base lens. This means that the amount of progressively increasing negative power on the anterior surface veneer cover is directly proportionate to the focussing power of the base lens. The vertex power error created by the change in vertex distance from the eye to the edge of the lens, as compared to the distance from the eye to the center of the lens, and the reciprocal of this number becomes the amount of progressively increasing negative correction on the veneer cover lens.

Next, the veneer cover lens VC+, VC− is laminated to the high index base mount lens BL+ BL−. This lamination is achieved by placing the high index of refraction base lens BL+, BL− on a fixture. Optical glue is then applied in a predetermined amount to the front surface of the base lens. Capillary attraction automatically spreads the glue evenly and without bubbles when the veneer lens is positioned atop the glass mount. The combination of the two lenses is then placed under a black light for about 10 seconds accomplishing a quick set. The combination can then be removed from the fixture and placed under ultraviolet black light for three hours to accomplish a complete cure. The completed lens L−, L+ (see FIGS. 1 and 4) is now ready for cutting and edging into the appropriate frame using the usual techniques of the ophthalmic industry.

Figure 4:
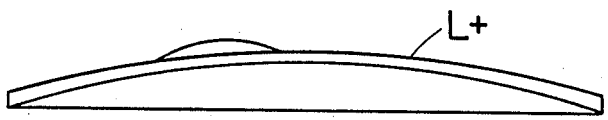
FIG. 4 is a view comparable to FIG. 1, but showing a composite lens with a plus correction identified as L+.

As shown in FIGS. 1 and 4, both of the lenses L− and L+ respectively have a vocational segment illustrated in the zone of zero correction 0. This is readily cast into the CR-39 veneer cover VC+, VC−. In certain instances with a high negative correction, the front portion of the base lens BL− is flat, and the corresponding veneer cover VC− is also flat, but contains the same central zone with zero correction, and the peripheral zones with a negative correction. The preferred material for the base lens is known as ohara glass with an index of refraction of 1.83. The veneer cover is preferably formed from CR-39 plastic as set forth. Other materials are contemplated, however, but the aspheric correction is invariably applied to the veneer cover as well as the vocational insert. Also polarized films can be placed between the veneer cover VC+, VC− and the base lens BL+, BL−. The tinting is applied to the veneer cover VC+, VC− with standard techniques offering virtually an unlimited range of tinting as to colors and intensity. The veneer cover can also be hardened which, when sandwiched with the base lens, reinforces the same and gives it a strength which heretofore cannot be achieved by basic hardening of the high index of refraction glass. A scratch resistant coating is also optionally applied to the veneer cover VC+, VC−.

Although particular embodiments of the invention have been shown and described in full here, there is no intention to thereby limit the invention to the details of such embodiments. On the contrary, the intention is to cover all modifications, alternatives, embodiments, usages and equivalents of the laminated high correction eyeglass lens as fall within the spirit and scope of the present invention, specification, and the appended claims.

What is claimed is:

1. A high correction eyeglass lens comprising, in combination,
   a prescription base lens having a high index of refraction,
   said prescription base lens being conformed to a high plus or minus correction,
   a veneer lens proportioned to physically and optically laminate to the front of the base lens,
   said veneer lens having a central zone without correction and a peripheral annular zone,
   said peripheral annular zone having only progressive negative correction proceeding from the central zone to the edge of the lens,
   said negative correction offsetting vertex power error.

2. In the high correction eyeglass lens of claim 1,
   said peripheral zone being divided into two segments,
   the segment adjacent the central zone without correction having one negative correction, and,
   the peripheral segment having a greater negative correction.

3. In the high correction eyeglass lens of claim 1,
   said base lens having a high negative correction.

4. In the high correction eyeglass lens of claim 1,
   said veneer lens having a vocational correction in the central uncorrected zone.

5. In the high correction eyeglass lens of claim 1,
   said base lens having a high positive correction.

6. A method for forming an eyeglass lens having a uniform peripheral correction where high powered corrections are required, and reducing the thickness of the lens, comprising the steps of:

selecting a base prescription lens blank from a material having an index of refraction of a high order, forming said lens to the high correction prescribed for the patient, applying an overlay laminate to said lens which is optically and physically bound to the base lens, providing a central plane section for said overlay, and forming a progressive negative correction annular peripheral zone outside the central zone and proceeding to the edge of the overlay laminate with the negative correction calculated to offset the pupillary increased distance from the center of the base lens to the periphery which results in a positive correction to the eyeglass wearer in the absence of the offsetting negative correction supplied by the overlay selected to offset vertex power error.

7. In the method of claim 6 above, wherein said correction of the base lens is negative, and where the base lens is provided with a flat front surface, and matching the overlay laminate lens for the flat surface.

8. In the method of claim 6 above, applying a high positive correction to said base lens with the frontal portion of said lens being curvilinear, selecting a curvilinear laminate lens for physical engagement with the curvilinear front portion of said base lens, and placing the negative correction on the periphery of the laminate.

9. In the method of claim 6 above, selecting a plastic laminate overlay, and tinting said plastic overlay.

10. In the method of claim 6 above, supplying said laminated overlay lens in plastic, and scratch treating the face of the plastic, whereby the patient is supplied with a lens having an otherwise breakable base lens which is reinforced by the plastic overlay.

* * * * *